L. B. GRIFFIN.
TRAVELING BUCK FOR TIRE BUILDING MACHINES.
APPLICATION FILED FEB. 7, 1918.
1,278,637.
Patented Sept. 10, 1918.
3 SHEETS—SHEET 2.
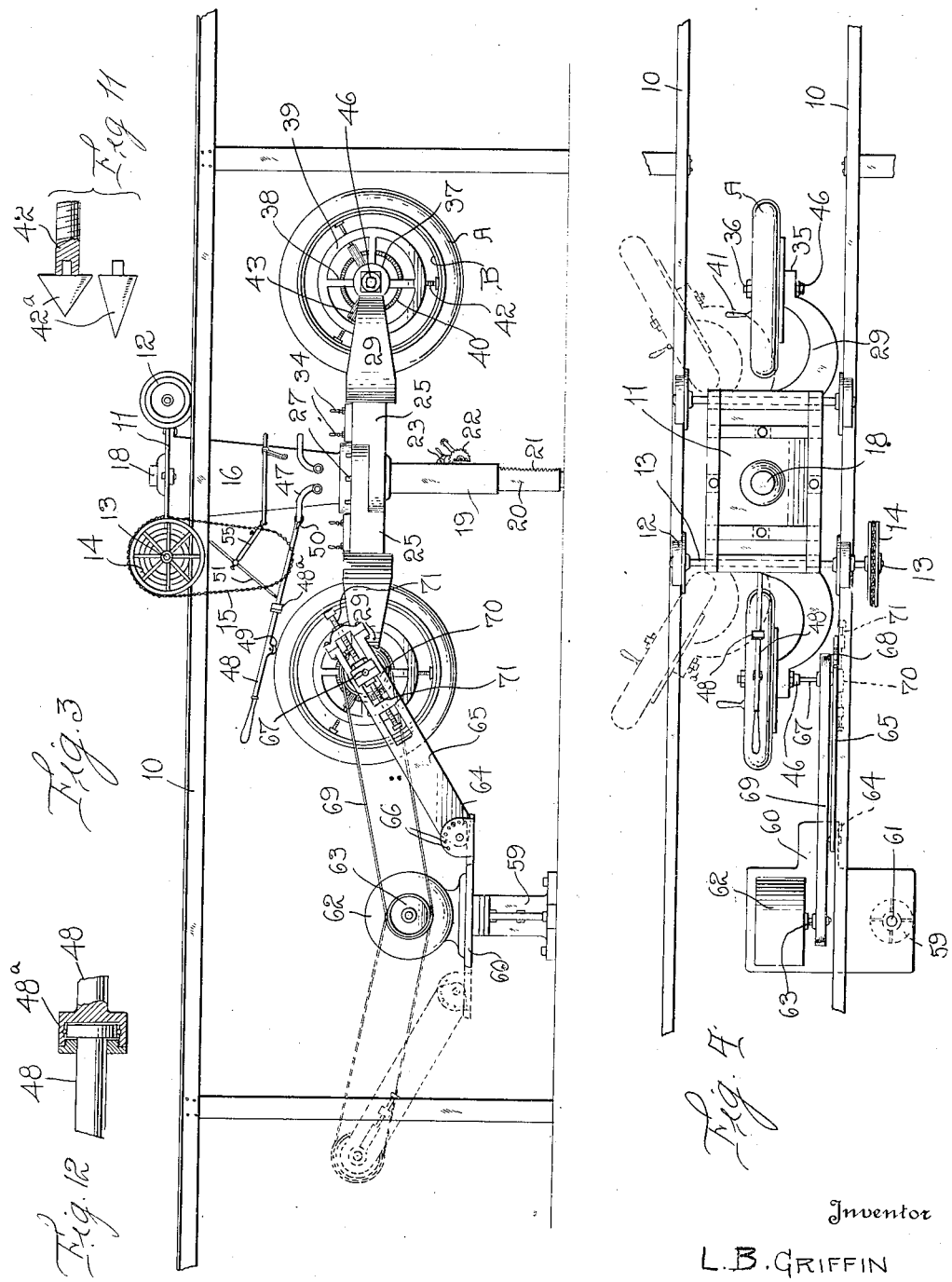
Inventor
L. B. GRIFFIN
By Watson E. Coleman
Attorney

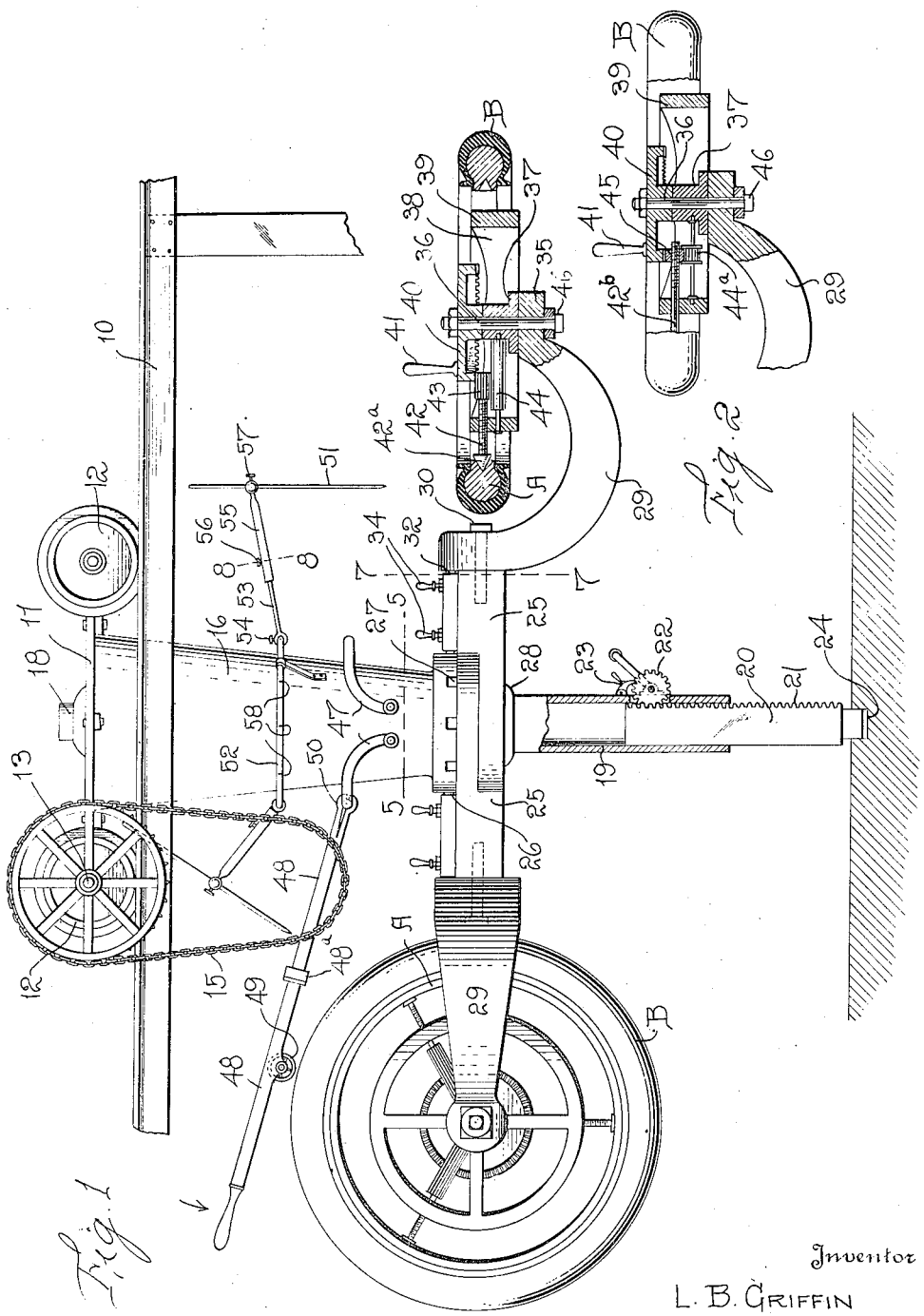

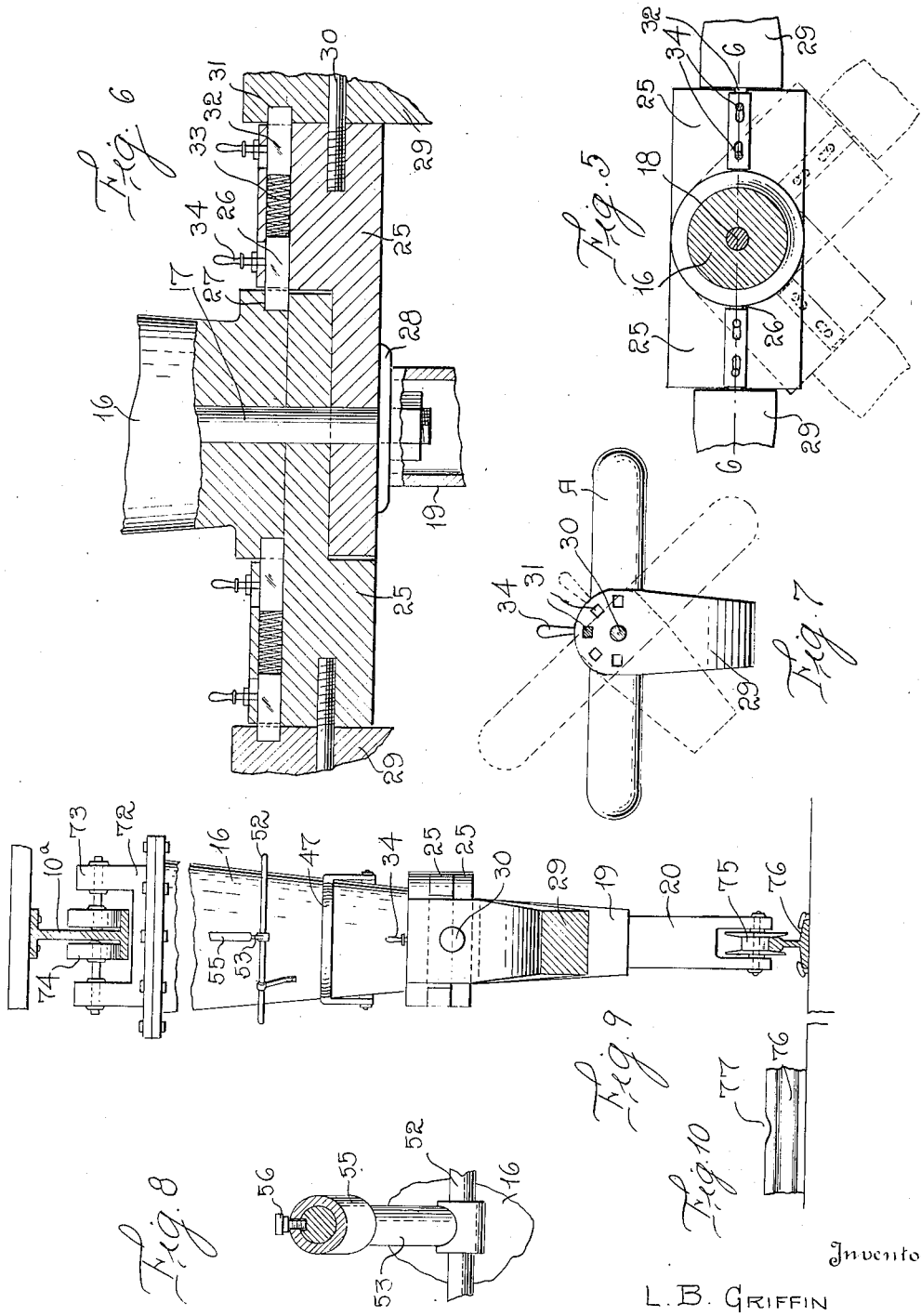

UNITED STATES PATENT OFFICE.

LEO B. GRIFFIN, OF MUSKEGON, MICHIGAN.

TRAVELING BUCK FOR TIRE-BUILDING MACHINES.

1,278,637.                    Specification of Letters Patent.     Patented Sept. 10, 1918.

Application filed February 7, 1918.   Serial No. 215,810.

*To all whom it may concern:*

Be it known that I, LEO B. GRIFFIN, a citizen of the United States, residing at Muskegon, in the county of Muskegon and State of Michigan, have invented certain new and useful Improvements in Traveling Bucks for Tire-Building Machines, of which the following is a specification, reference being had to the accompanying drawings.

This invention relates to machines for making rubber tires or tire casings, and particularly to the "bucks" upon which the wrapped iron forms are supported while the bead strips, the side walls, the "breaker," the cushion and the tread are being applied.

In the manufacture of tires or tire casings today, a great deal of time is lost due to the fact that after the iron form for the tire has been wrapped with textile fabric, it is placed upon a "buck" or support which is fixed in place at one point of the shop and that a single worker then proceeds to put on the bead strips, "side walls," "breaker," the cushion, and the tread. These various parts or portions of the tire are kept in separate racks or compartments, often relatively distant from the "buck" and the worker has to make trips to these racks, bins or compartments in order to get these separate parts, thus greatly delaying the finishing of the tire. Furthermore, this requires that the workers shall be skilled in applying all of these different parts of the tires and, as a consequence, the wages of the workers are relatively high, the output is relatively small and the cost of the tire is, therefore, greatly increased over what it would be if the tire in the course of manufacture could be passed from one worker to another, each worker specializing in some particular part of the operation, the tire with the parts applied thereto as described then passing to the inspector and thence passing to the press or finishing machine.

Furthermore, rubber as it is applied to tires is very sticky and difficult to handle, and the finisher or other operator carrying the strip, which he has taken from the rack or bin and walking back to the fixed buck in order to apply it to a tire, often gets it stuck together and bunched up so that it is impossible to get the strip back into shape again. Again, the workmen are very liable to cut the material by guess and thus there is a large waste.

The general object of my invention is to do away with this system of handling and manufacturing rubber tires, by providing a traveling "buck" or tire holder arranged to travel in a predetermined path through the tire building shop to receive the wrapped cores from the core wrapping machines and to carry these cores around the shop to the various workers. Thus the buck is carried first to the worker who applies the bead strips. The buck is then sent to the next rack where side walls are applied. It is then sent to the next rack where it receives a "breaker." At the next rack it receives the cushion and at the next rack the tread and after this it moves to the inspector who inspects the tire and from there to the press. After the tire is completed, the tire is removed and the buck returned by a return track to its original place for reloading. It will be seen that this does away with the loss of time incident to carrying the parts of the tire back and forth between the racks and a stationary buck and furthermore that it permits each worker to become skilled in some particular part of the process doing away with the necessity of each worker being skilled in all or nearly all of the different processes, thus permitting of the use of relatively unskilled labor and indeed permitting, because the tire with its core does not have to be lifted and carried, the use of women as workers, thus of course greatly reducing the cost of the tire.

A further object of the invention is to provide a buck adapted to travel upon a rail or rails and having means whereby it may be manually propelled from one place to another on the track so formed, which buck is so constructed that one or a number of tire cores with the partially finished tires may be carried thereon.

A further object is to provide means whereby the buck, when it arrives at any particular stopping place, may be steadied, while the tire is being manipulated.

Another object is to provide a buck with core supporting means so constructed as to permit the core and tire to be rotated and also permit the core and tire to be shifted in a horizontal plane around the axial center of the buck and also permit each tire and core to be shifted so that the angle of the plane of the tire and core may be changed, thus positioning the tire and core most conveniently for the workers operating thereon.

Still another object of the invention is to provide means whereby power, at one stage of the manufacture, may be readily applied to the spindle upon which the core and tire are mounted so that the core and tire may be rotated at a high speed to permit the tread or other parts to be firmly pressed into engagement with the body of the tire, and in this connection to provide means for pressing the tread into firm engagement with the body of the tire, said means being mounted upon and traveling with the buck.

Still another object of the invention is to provide means for indicating the exact center of a tire without regard to the adjustment of the tire support, to permit the treads to be adjusted on the dead center of the rim.

A further object of the invention is to provide means for rotatably supporting the core and tire upon the buck and in this connection to provide a plurality of radially disposed supporting screws or pins adapted to be shifted radially outward to engage tire cores of different diameters and to provide means whereby all of said screw pins may be simultaneously shifted inward or outward, thus doing away with the necessity of individually turning each pin outward or inward when a tire is put in place upon the buck.

These and other objects will be fully explained hereafter.

An embodiment of my invention is illustrated in the accompanying drawings, wherein:

Figure 1 is a side elevation of a portion of track and of a buck constructed in accordance with my invention, one of the tires with its core and a portion of the supporting arm and allied mechanism being in section;

Fig. 2 is a fragmentary sectional view of a modified form of mechanism for engaging the tire core;

Fig. 3 is a side elevation of the construction illustrated in Fig. 1 and of the means for giving a rotation to the tire while the tread is being applied;

Fig. 4 is a top plan view of the construction illustrated in Fig. 3;

Fig. 5 is a fragmentary horizontal sectional view on the line 5—5 of Fig. 1;

Fig. 6 is an enlarged vertical sectional view on the line 6—6 of Fig. 5;

Fig. 7 is a sectional view on the line 7—7 of Fig. 1;

Fig. 8 is a fragmentary sectional perspective view, the section being taken on the line 8—8 of Fig. 1;

Fig. 9 is a side elevation partly in section of a buck constructed in accordance with my invention but showing a modified manner of supporting the buck;

Fig. 10 is a fragmentary side elevation of the rail 76;

Fig. 11 is a fragmentary longitudinal sectional view of one of the pins 42 showing the detachable heads; and Fig. 12 is a sectional side elevation of a portion of the lever 48 showing the swivel 48$^a$.

Referring to the drawings, and particularly to Figs. 1, 3 and 4, 10 designates a pair of rails of any suitable construction, which are supported at a suitable elevation from the floor and which extend around the shop so as to form a closed track. Of course the detailed arrangement of the track will depend upon the detailed arrangement of the shop as regards the positioning of the tire building machine, the various racks, the positions of the various workers, the position of the inspector and of the press, etc.

Operating upon the rails 10 is a trolley or carriage designated generally 11, and illustrated as carrying two pairs of wheels 12 mounted upon shafts 13. One of said shafts is provided with a sprocket wheel 14 over which passes a loose sprocket chain 15 which depends to a degree permitting a workman to readily operate the sprocket to thereby cause the movement of the carriage upon the rails. Depending from the carriage 11 is a column 16 which is fixed in any suitable manner from rotative movement and which is socketed to receive a pivot bolt or pin 17, as illustrated in Fig. 6. This pivot bolt or pin 17 may extend up through the carriage and be engaged by a cap nut 18 or any other suitable arrangement of this character may be made. The lower end of this bolt 17 extends into the upper wall of a hollow leg 19 and operating within this hollow leg is an adjustable leg section or jack 20 which is illustrated as being provided with a rack face 21 adapted to be engaged by a gear wheel 22 mounted upon the leg section 19, this gear wheel being rotated by a crank to raise or depress the jack 20 and the gear wheel being held in any adjusted position by a pawl 23.

The floor of the building is provided at suitable intervals with recesses or sockets 24 as shown in Fig. 1 to receive the reduced lower end of the jack 20. The leg 19 with the jack 20 is designed to support and hold the traveling "buck" in its operative position. Mounted for rotative movement in a horizontal plane around the bolt 17 are arms 25, two of these arms being shown. These arms are reduced at their inner extremities so as to face against each other as shown clearly in Fig. 6, and these arms, as shown in Fig. 6, carry spring actuated bolts 26 which engage in notches or recesses 27 formed in the enlarged base of the column 16. Preferably this column 16 is downwardly tapered nearly to the lower end of the column where it is diametrically enlarged. By this means either one of the arms 25 may be locked in any desired rotatively adjusted position with relation to the column 16. The upper end of the leg 19 is preferably provided with a flange 28 which affords a support for the arms 25.

Carried upon the outer end of each arm 25 and forming part thereof is an approximately semi-circular extension 29 or auxiliary arm, which is supported upon the end of its arm 25 by means of a pivot screw or pin 30, so that it may be rotatably adjusted around this pivot screw or pin as on an axis. The basal end of each extension 29 is provided with a plurality of sockets 31 as illustrated in Fig. 7 and in Fig. 6, in which spring actuated lock bolts 32 engage, as clearly shown in Fig. 6. As illustrated, the lock bolts 26 and 32 are disposed in alinement with each other and a spring 33 is disposed between the bolts and is common to both bolts and urges both bolts outward. Each of the bolts is provided with a finger piece 34 whereby the respective bolts may be shifted inward against the force of the spring 33 to detach them from their corresponding keepers or notches and permit the adjustment of the main arms 25 or the auxiliary arms 29.

Each of the arms 29 at its outer extremity has a bearing portion 35 extending parallel to the axis of the auxiliary arm and passing upward through this bearing portion is a bolt 36 carrying a hub 37. Disposed concentrically to the hub 37 and held thereto by suitable arms 38 is an annulus 39. Rotatably mounted upon the bolt 36 above the hub 37 is a crown gear wheel 40 having a handle 41 whereby it may be rotated. Having screw-threaded engagement with the annulus 39 are a plurality of radially disposed screws 42 having arrow-shaped or pointed heads 42ª and having at their inner ends relatively elongated gear wheels 43 with which the teeth on the crown gear are adapted to engage. I have illustrated three of these screw pins 42 but I do not wish to be limited to this number.

Rotatably mounted in any suitable manner between the annulus 39 and the hub 37 are a plurality of elongated idler gears 44 with which the gears 43 are adapted to mesh and which simply act to support the gears 43. The gears 43 are elongated so that as the crown gear wheel 40 is rotated, the gears 43 can not only rotate but may be shifted outward and inward depending upon the direction of rotation of the screws 42. It will thus be seen that I have provided means for shifting all of the screws 42 out at one time or unitarily withdrawing the screws 42 from their projected positions. This construction constitutes a chuck, the pointed ends of the screws 42 being adapted to engage with the tire cores A and hold a tire core in concentric position relative to the bolt 36.

In Fig. 2 I show a modification of the construction illustrated in Fig. 1 for supporting the tire core. This modified construction embodies the bolt 36, the crown gear 40 having the handle 41, the hub 37 and the annulus 39 but in this case the screw pins 42ᵇ have screw-threaded engagement with a gear wheel 45 which in turn is engaged by the crown gear wheel so that as the crown gear wheel is rotated, the gear wheels 45 which constitute nuts will also be rotated to thereby project or retract the screw pins 42ᵇ. For the purpose of supporting the gear wheels 45 and the inner ends of the screw pins 42ᵇ, I provide the idler gear wheels 44ª which have flanges at the ends to hold the nuts or gear wheels 45 from longitudinal movement, these gear wheels 44ª being mounted upon radially disposed shafts, in turn mounted in the annulus 39 and the hub 37. It is to be understood that the bolt 36 is provided with a head 46 whereby, as will be hereafter described, this shaft 36 may be connected to power operative means for rotating it.

Mounted upon the column 16 above the base of the column are two opposed curved yokes 47, there being as many of these yokes as there are arms 25. These yokes are curved concentrically to the column 16 and to these yokes levers 48 are adapted to be connected, these levers each carrying a pressing wheel 49. Preferably the inner end of each lever is split and provided with a clamp 50 adapted to be engaged over the yoke so that the lever is detachably supported upon the yoke. The wheel 49 may be of any suitable shape in cross section and is adapted to be forced down upon the tire B which is supported upon the core A in the manner illustrated in Fig. 1 so as to force the tread when it is applied, into firm engagement with the body of the tire. By using the lever 48, however, a very firm and steady pressure will be secured upon the tire, and it will be seen that this pressure is directed toward the axis of the tire when the tire is in a vertical position as illustrated at the lefthand end of Fig. 1. Each lever is in two sections, the outer section being swiveled to the inner section at 48ª so that the wheel 49 may be engaged with the side of the tread when the wheel is in a vertical plane or with the wheel of the tread.

Also mounted upon the column 16 are a plurality of indicator rods or pointers 51, there being as many of these indicators as there are arms 25 and for the support of these pointers I have provided a ring 52 which is supported by brackets upon the column 16 and in spaced relation to the column and concentrically thereto. Rotatably mounted upon the ring 52 are the arms 53 which are held in adjusted position by set screws 54 and engaging over each of these arms is a telescopic section 55 held in adjusted position by a set screw 56, each of these telescopic sections 55 having a head at its extremity through which the pointer 51 passes, the pointer 51 being held in adjusted position by means of a set screw 57.

The indicator or pointers 51 are by this mounting shiftable about the column so that no matter at what angle the swinging arms formed by the members 25 and 29 are set, the indicator will indicate or point to the exact center of the tire for all tire sizes, so that the treads can be adjusted on the dead center of the rim. The ring 52 is provided with graduation marks 58 at intervals, these graduation marks being on a line with the sockets 27. It is obvious that the telescopic supporting arms for each indicator or pointer may be swung upward or downward, that the indicator pointer may be adjusted nearer to or farther from the column, to suit different diameters of tire, and that various adjustments may be made which may be rendered necessary by the character of the work to be done.

In Figs. 3 and 4 I illustrate the means whereby power may be applied to the spindle or bolt 36 for the purpose of rotating the chuck formed by the members 37 and 39. To this end I dispose upon the floor of the shop a column 59 supporting a table or plate 60 which is rotatably mounted upon the column for rotation around a pivot 61. Mounted upon this table 60 is a motor, as for instance, an electric motor 62, carrying a band wheel 63. The table 60 is provided with an upwardly projecting ear 64 and pivoted to this ear is an arm 65. The ear 64 is provided with a plurality of perforations 66 concentric to the pivot of the arm 65, there being a pin or bolt adapted to engage in any one of said perforations to thereby hold the arm 65 in any vertically adjusted position. Carried upon the extremity of the arm 65 is a shaft 67 having a socket at its end adapted to engage with the head 46, this shaft carrying a band wheel 68. A band 69 transmits power from the band wheel 63 to the band wheel 68 to rotate the shaft. I have illustrated means for tightening the belt or slackening it to thereby take up slack due to different adjustments of the arm 65, this means comprising a bearing 70 for the shaft 67, the bearing being slidably mounted in the arm 65 and being held in adjusted positions by means of the screws 71. Any other means to the same end may be provided, however.

With this mechanism last described when the buck has arrived at a point where it is necessary to rotate the chuck carried by the buck, the table 60 is swung around from an inoperative position to its operative position to thereby bring the shaft 67 into engagement with the head 46 on the shaft 36. The chuck may then be rotated under power while pressure is being applied to the tire under construction, as for instance the pressure of the wheel 49. In many cases, however, it is not necessary to apply this pressure or apply pressure in this manner and at these points no power driven means is provided, but the chucks are rotated by hand, while the strips of rubber are being applied and pressed to the body of the tire.

It is to be noted that with this construction not only are a plurality of chucks provided for the support of tire forms and tires, but that these chucks may be shifted in a horizontal plane and held in any shifted position which may be most convenient for the worker and that these chucks may also be shifted from a horizontal plane to a vertical plane by shifting the corresponding arm 29 and into any intermediate angular relation to a horizontal or a vertical plane. Thus the tire may be brought into any convenient relation to the operator which permits the easiest manipulation to be performed and places the tire in the most convenient position for work. Either side wall of the tire may be disposed to face upward, and thus access may be had to every portion of the tire.

While I have illustrated in Figs. 3 and 4 a trolley or carriage which is supported upon a pair of rails, I do not wish to be limited to the use of a pair of rails and in Fig. 9 I show a modification illustrating this fact. In this modification the construction of the buck is the same as previously described, the only difference being however that instead of two upper rails 10 I have provided a single channel iron rail designated 10ᵃ which is supported in any convenient way above the floor and have provided the upper end of the column with a member 72 having upwardly extending ears 73 and two laterally disposed supporting wheels 74 mounted in these ears and bearing upon the lower flange of the channel iron 10ᵃ. The lower end of the buck may be provided with the jack 20 adapted for insertion in a socket in the floor, or as illustrated in Fig. 9, this jack 20 may be bifurcated and carry a wheel 75 adapted to engage with a track 76. This track may be slightly depressed at intervals as at 77 (see Fig. 10) so that the jack may be lowered to bring the wheel 75 into the depression and thus hold the buck in its desired position or the jack may be shifted simply to press the wheel 75 against the track 76 and thus prevent any travel of the buck. It will be understood that various forms of track may be used and various forms of trolley or carriage and that I do not wish to be limited to the particular construction illustrated.

Furthermore while I have illustrated a buck having details of construction which I have found particularly effective in practice, it will be obvious that these details may be modified in many ways without departing from the spirit of the invention, as defined in the appended claims.

Inasmuch as the interior diameters of cores vary considerably for different sized wheels, I preferably provide each of the screw pins 42 with a head 42$^a$ which, as illustrated in Fig. 11, has screw-threaded detachable engagement with the end of the screw pin 42. Thus heads of different lengths may be applied to the screw pins 42 to compensate for different diameters of cores.

Having thus fully described my invention, what I claim is:

1. In mechanism for forming tires the combination with an overhead supporting rail, of a traveling buck and tire core support bodily movable along said rail, means carried by the buck for holding the buck at any predetermined point along said rail, comprising a vertically movable member, and manually controlled means for vertically shifting the member into or out of operative position.

2. In mechanism for forming tires, the combination with supporting rails, of a traveling buck and tire core support mounted to travel on said rails, and means for holding the buck at any predetermined point along said rails, comprising a vertically movable jack, and means for manually forcing the jack downward or raising the jack and holding it in adjusted positions.

3. In mechanism for forming tires, the combination with supporting rails, of a traveling buck and tire core support mounted to travel on said rails and comprising a carriage engaging the rails, a column depending therefrom, and means for holding the buck at any predetermined point in its travel including a hollow leg attached to the column, a jack telescoping within said leg and having rack teeth, a gear wheel mounted on the leg engaging the jack, manually operable means for rotating the gear wheel, and a pawl for holding the jack in adjusted positions.

4. A traveling buck comprising a wheeled carriage, a column mounted thereon, an arm rotatably mounted upon the column for rotation around the longitudinal axis thereof, means for holding the arm in a rotatably adjusted position, a tire core supporting chuck, and means for supporting the chuck for rotation around its own axis and rotation around an axis extending through the chuck at right angles to its own axis.

5. A buck including a column, an arm mounted upon the column for rotation around the axis of the column, a core chuck supporting member mounted upon the arm for rotation in a plane at right angles to the plane of rotation of the arm, and a core chuck mounted upon said member for rotation around its own axis in the plane of the rotation of said arm.

6. A buck of the character described comprising a supporting column, an arm mounted upon the column for rotation around the longitudinal axis thereof, a detent carried by the arm, the column being provided with a plurality of openings with which the detent is engageable, a curved member mounted upon said arm for rotation in a plane at right angles to the plane of rotation of the arm and having a plurality of recesses arranged concentrically to the axis of the member, a detent on the arm engageable in any one of said recesses, and means upon the extremity of the member for rotatably supporting the core chuck.

7. In mechanism for forming tires, the combination with an overhead supporting rail, of a carriage traveling on said rail, a column depending from the carriage, means mounted on the column for holding the column at any desired point from longitudinal movement, an arm rotatably mounted upon the column for rotation in a horizontal plane, a curved member pivotally mounted upon the extremity of the arm for rotation in a vertical plane, and a core supporting chuck mounted upon the extremity of said member for rotation in a plurality of planes around its axis.

8. A traveling buck comprising a wheeled carriage, a column carried thereby, an arm formed in two sections, the innermost section being mounted upon the column for rotation in a horizontal plane, the outermost section being mounted upon the innermost section for rotation in a vertical plane, means for holding the innermost section in adjusted relation to the column and for holding the outermost section in an adjusted relation to the innermost section, and a core supporting chuck rotatably mounted upon the outermost section.

9. A traveling buck comprising a wheeled carriage, a column depending from the carriage, an arm rotatably mounted on the column for rotation in a horizontal plane, means for holding the arm in rotatably adjusted positions, a core chuck rotatably mounted upon the extremity of the arm, and a jack mounted upon the column for vertical movement and adapted to be forced against the floor or raised therefrom to thereby hold the buck at a predetermined point and support it.

10. A traveling buck comprising a wheeled carriage, a column depending therefrom and having a centrally disposed bearing member at its lower end, an arm section rotatably mounted upon said bearing member for rotation in a horizontal plane, a bolt mounted upon the arm section, the column being provided with notches with which said bolt may engage, an outer arm section mounted upon the first arm section for rotation in a vertical plane, a bolt mounted upon the inner arm section, the outer arm section being provided with a notch with which said bolt engages, a spring urging both of said bolts outward, and a rotatable core supporting chuck mounted upon the extremity of the second named arm section.

11. The combination with a traveling buck including a carriage, a column mounted thereon, an arm mounted upon the column, and a rotatable chuck mounted upon the arm and including a shaft, of means for applying power to said shaft comprising a rotatable support having a motor, an arm adjustably mounted on the support and having a shaft engageable with the shaft on the chuck, and means for transmitting the power of the motor to said shaft, the rotatable supporting member permitting the motor and power transmitting means to be shifted out of the path of travel of the buck.

12. The combination with a traveling buck including a carriage, a column mounted thereon, and a rotatable chuck mounted upon the column and including a shaft, of means for applying power to said shaft comprising a motor disposed adjacent the path of movement of the carriage, a pivotally mounted arm having a shaft detachably engageable with the shaft on the chuck, and means for transmitting the power of the motor to said shaft.

13. The combination with a traveling buck including a carriage, a column carried thereby, and a rotatable chuck mounted upon the column and including a shaft, of means for applying power to the shaft comprising a rotatable support having a motor, a shaft operatively mounted upon the support and rotatable therewith in a horizontal plane, said shaft being engageable with the shaft on the chuck, and means for transmitting the power of the motor to the shaft.

14. The combination with a traveling buck, including a carriage, a column mounted thereon and a rotatable chuck operatively supported upon the column and including a shaft, of means for applying power to said shaft comprising a rotatable support, an arm adjustably mounted on the support and having a shaft detachably engageable with the shaft on the chuck, and means for transmitting power to said shaft, the rotatable supporting member being shiftable out of the path of travel of the buck.

15. The combination with a buck having a column, an arm mounted upon the column, and a tire core supporting chuck rotatably mounted upon the arm for movement in a vertical plane, of a yoke embracing the column and having a portion extending concentrically thereto, and a lever detachably engaged at its inner end with the yoke extending out over the chuck and having a tire engaging roller mounted thereon.

16. A buck of the character described including a supporting column, an arm rotatably mounted on the column for movement in a horizontal plane, a tire core chuck mounted upon the arm for rotation around its own axis, and for independent rotative adjustment around an axis at right angles to the axis of rotation of the arm whereby the core chuck may be inclined at various angles to the horizontal, and a lever operatively supported upon the buck and carrying a roller, the lever being movable in a vertical plane to permit the roller to be forced against a tire supported upon the chuck to thereby compress the material of the tire.

17. The combination with a buck having a column and a tire core mounted upon the column for rotation upon its own axis, for bodily rotation in a horizontal plane and bodily rotation in a vertical plane, of a lever operatively supported upon the buck having a roller the lever being formed in two sections having swiveled engagement with each other whereby the roller may be canted.

18. A buck of the character described including a supporting column, an arm rotatably mounted upon the column for movement in a horizontal plane, and a tire core chuck rotatably mounted upon the extremity of the arm, of means mounted upon the column for indicating the tread center of the tire supported on said core, said means including a supporting ring mounted upon and concentric to the column, a telescopic arm mounted upon the ring for vertical adjustment, a pointer mounted upon the extremity of the arm and extending in a vertical plane, and means for holding the pointer longitudinally adjusted through the end of the arm, means for holding the telescopic arm sections in adjusted positions, and means for holding the arm in adjusted position upon the annulus.

19. A buck of the character described including a supporting column, a tire core chuck mounted upon the column for bodily rotation in a horizontal plane, for rotation around its own axis, and for rotation in a vertical plane, whereby the chuck may be canted, of means mounted upon the column for indicating the dead center of the tire including a supporting ring mounted upon and concentric to the column, a telescopic arm mounted upon the ring for rotation concentric to the axis of the column and for vertical adjustment, and a pointer mounted upon the extremity of the arm and extending in a vertical plane.

20. A buck including a supporting column, a plurality of arms mounted upon said column for independent rotation in horizontal planes, means for holding the arms in adjusted positions, and core supporting chucks carried upon the arms.

21. The combination with a buck and a core supporting chuck rotatably mounted upon the buck and shiftable into a vertical plane, of a lever associated with the buck disposed above it and having a roller adapted to be forced toward the axis of the chuck to compress the material on the core, said lever being formed in two sections axially rotatable with relation to each other.

In testimony whereof I hereunto affix my signature in the presence of two witnesses.

LEO B. GRIFFIN.

Witnesses:
    PETER DRAKE,
    LENA DRAKE.